(12) United States Patent
Cameron et al.

(10) Patent No.: US 7,788,729 B2
(45) Date of Patent: Aug. 31, 2010

(54) METHOD AND SYSTEM FOR INTEGRATING MULTIPLE IDENTITIES, IDENTITY MECHANISMS AND IDENTITY PROVIDERS IN A SINGLE USER PARADIGM

(75) Inventors: Kim Cameron, Bellevue, WA (US);
Arun K. Nanda, Sammamish, WA (US);
Stuart L. S. Kwan, Redmond, WA (US);
John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 11/073,131

(22) Filed: Mar. 4, 2005

(65) Prior Publication Data
US 2006/0200424 A1 Sep. 7, 2006

(51) Int. Cl.
*H04L 29/06* (2006.01)
(52) U.S. Cl. ......................... 726/30; 713/167
(58) Field of Classification Search .................. 726/1–4, 726/6, 30, 22; 713/165–167; 705/73–76, 705/80, 51
See application file for complete search history.

(56) References Cited

U.S. PATENT DOCUMENTS

| | | | |
|---|---|---|---|
| 7,059,516 B2 * | 6/2006 | Matsuyama et al. | 235/382 |
| 2002/0062453 A1 * | 5/2002 | Koga | 713/202 |
| 2003/0084343 A1 * | 5/2003 | Ramachandran et al. | 713/201 |
| 2003/0226151 A1 * | 12/2003 | Hamada et al. | 725/132 |
| 2005/0005170 A1 * | 1/2005 | Camenisch et al. | 713/201 |
| 2005/0114701 A1 * | 5/2005 | Atkins et al. | 713/201 |
| 2005/0125686 A1 * | 6/2005 | Brandt | 713/200 |
| 2006/0200671 A1 * | 9/2006 | Ishigaki et al. | 713/176 |

* cited by examiner

*Primary Examiner*—Gilberto Barron, Jr.
*Assistant Examiner*—Venkat Perungavoor
(74) *Attorney, Agent, or Firm*—Merchant & Gould PC

(57) ABSTRACT

Exemplary embodiments disclosed herein may include a method and system for integrating multiple identities and identity providers, including, receiving the security policy of a service provider, determining the attributes requested by the service provider, obtaining authenticated attributes requested by the service provider, registering with a provisioning service based at least in part upon the authenticated attributes, and accessing services of the service provider based at least in part upon the registration from the provisioning service.

16 Claims, 5 Drawing Sheets

METHOD AND SYSTEM FOR INTEGRATING MULTIPLE IDENTITIES, IDENTITY MECHANISMS AND IDENTITY PROVIDERS IN A SINGLE USER PARADIGM

TECHNICAL FIELD

The invention relates generally to the field of computer and network security. More particularly, the invention relates to integrating multiple identities, identity mechanisms, and identity providers of computer systems and users.

BACKGROUND

Many transactions involving money and information occur everyday utilizing the Internet and Internet technologies. Furthermore, dishonest people are attracted to intercepting some of these transactions and stealing money and/or information. As a result, innocent, unsuspecting users are requested to reveal personal information, such as name, address, social security number, account numbers, credit card numbers, etc., that allow the imitators (i.e. those that set up the imitation or rogue sites) to steal the identity of the user, and/or money. Such theft is a growing problem.

More and more transactions may take place in the future. As users complete more and more transactions online, their comfort level may increase. This may increase the confidence of the user that the transactions are safe and secure. Additionally, these transactions may take place with many different websites and with many different user interfaces, making it difficult for a user to determine what information has been disclosed to the website and whether or not a given website is legitimate.

SUMMARY

Exemplary embodiments disclosed herein may include a method and system for alleviating the disadvantages noted above, as well as others. Exemplary embodiments disclosed herein may include a method and system for integrating multiple identities and identity providers, including, receiving the security policy of a service provider, determining the attributes requested by the service provider, obtaining the authenticated attributes requested by the service provider in the form of attribute assertions from a trusted attribute issuer and/or identity provider, registering with a provisioning service based at least in part upon the authenticated attributes, and accessing services of the service provider based at least in part upon the registration from the provisioning service and/or the attributes requested by the service provider.

Exemplary embodiments disclosed herein may be implemented as a computer process, a computing system, a computer-based device or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present disclosure and its improvements can be obtained by reference to the accompanying drawings, which are briefly summarized below, and to the following detailed description of exemplary embodiments, and to the appended claims.

DETAILED DESCRIPTION

Figure 1:
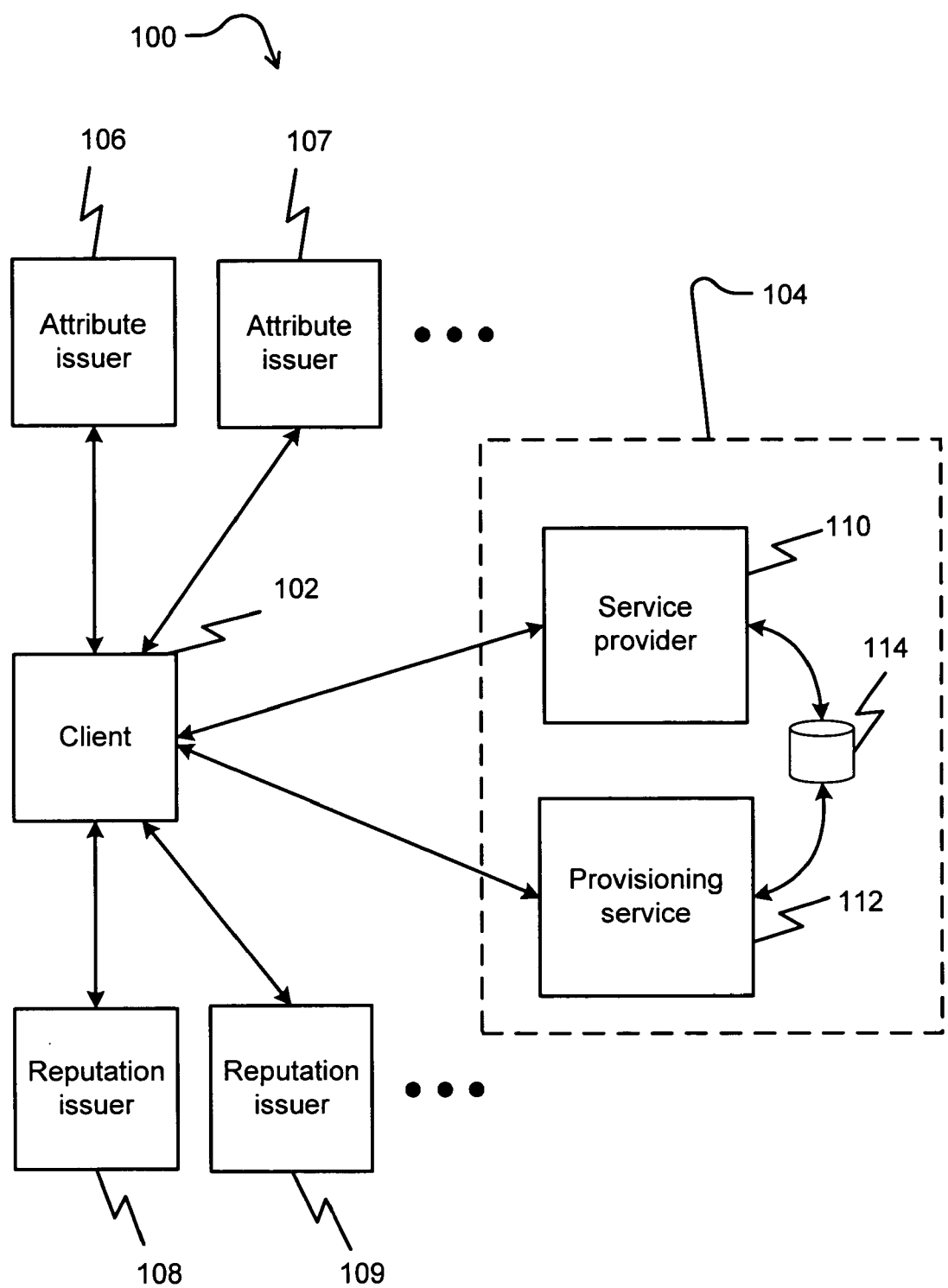
FIG. 1 is a block diagram of a system for integrating multiple identities, identity mechanisms and identity providers according to an exemplary embodiment.

FIG. 1 is a block diagram of a system, which may be utilized for integrating multiple identities, identity mechanisms and identity providers in a single user paradigm according to an exemplary embodiment, generally at 100. In this embodiment system 100 includes a client 102 and a server 104. Client 102 may be communicationally coupled to server 104 such that they may exchange information. As will become apparent, most devices can function as both client 102 and a server 104 at various times. However, for simplicity, these functions are illustrated separately here. Additionally, Client 102 may be coupled to server 104 via a network. The network may be any type of network including the Internet or may be some other type of channel suitable for establishing communication between the client 102 and the server 104.

System 100 may also include one or more attribute issuers and/or identity providers 106, 107, as well as one or more reputation issuers 108, 109. The terms attribute issuer and identity provider are used interchangeably in the remainder of this document. Attribute issuer 106 may be similarly communicationally coupled to client 102. Similarly reputation issuers 108, 109 may be coupled to client 102 in a similar manner and/or configuration.

Server 104 may include a service provider 110, as well as a provisioning service 112. Furthermore, server 104 may include a database 114, which may be coupled to service provider 110, as well as provisioning service 112.

The client or a user of client 102 may access service provider 110. Client 102 may then receive the security policy of the service provider 110, as well as receiving the attributes requested by the service provider 110 for access to the service provider 110. Client 102 may then obtain authenticated attributes requested by the service provider 110. This may be accomplished by accessing attribute issuer 106. Attribute issuer 106 may authenticate the user of client 102 before issuing any attribute assertions such that issuer 106 may have a level of assurance that the user to whom they pertain actually wants them released. Attribute issuer 106 may be a service operated by a third party that is trusted and/or known by server 104, or it may be operated by the user of client 102 if that is acceptable to the service provider. That is, the attributes may be authenticated by the user, if acceptable by the service provider.

Client 102 may then present the attribute document, received from issuer 106 to service provider 110, in which the document includes the values of the attributes previously requested of client 102.

A user of client 102, may also select from a list of preconfigured attribute groupings that can be authenticated by one of the attribute issuers represented by 106, 107. With this configuration, a user of client 102 may have many preconfigured attribute groupings (considered throughout this document to be digital identities) that can be issued in whole, or in subset, by an associated identity provider and/or attribute issuer. In this manner client 102 may disclose varying degrees of identification, different types of information, or different identities from different identity providers and/or attribute issuers to the service provider 110 or other service providers.

Once the user of client 102 has selected an authenticated attribute grouping and received an attribute document from issuer 106, 107, client 102 may send this to provisioning service 112 if required by the security policy of service provider 110. Provisioning service 112 may operate similarly to registering a name and password at a website, such that once this information is provided to the provisioning service 112, access to authenticated operations of the service provider 110 may be allowed. Provisioning service 112 may then store the attribute document, or portions thereof, on database 114. It will be appreciated that although service provider 110 and provisioning service 112 are shown as separate, they may reside on the same server 104 and/or system or on separate servers. In this exemplary embodiment it is shown that the provisioning service 112 or registration service for a website may be separate from the content and/or service provider 110 of a server 104.

Therefore, once client 102 has sent an attribute document to the provisioning service 112, provisioning service 112 may authorize client 102 to perform the operations provided by service provider 110. When client 102 returns to service provider 110 at another time, service provider 110 may access the information from database 114 that had previously been stored there by provisioning service 112 such that client 102 would not have to go through the entire process of registering again. The service provider 110 may be able to access information on database 114, which would show that client 102 had previously registered and had thereby provided enough attribute information to allow service provider 110 to allow client 102 to access the services therein.

With this configuration, a user of client 102 may better control dissemination of information to various entities. Furthermore the user may have an enhanced level of control on choosing and releasing different identities or different types and groupings of attribute information when dealing with servers and associated web sites. Yet further, the servers and web sites may have an enhanced level of assurance of the validity of the information disclosed to them. Exemplary embodiments disclosed herein may provide added security for a user utilizing the Internet, as well as improving the security of many other Internet transactions. This heightened security may be of use to web providers and user, among many others.

A user of client 102 may also request and receive information from reputation issuer 108 as to various attributes of service provider 110. Client 102 may utilize one or more reputation issuers 108 to obtain information, reliability, authentication, etc. of service provider 110. This may provide the user of client 102 with an increased level of assurance that service provider 110 is a reputable website and/or service provider. This may also provide a user with more information such that the user may make a more informed decision whether to continue to interact with the server and/or associated web site.

Figure 2:
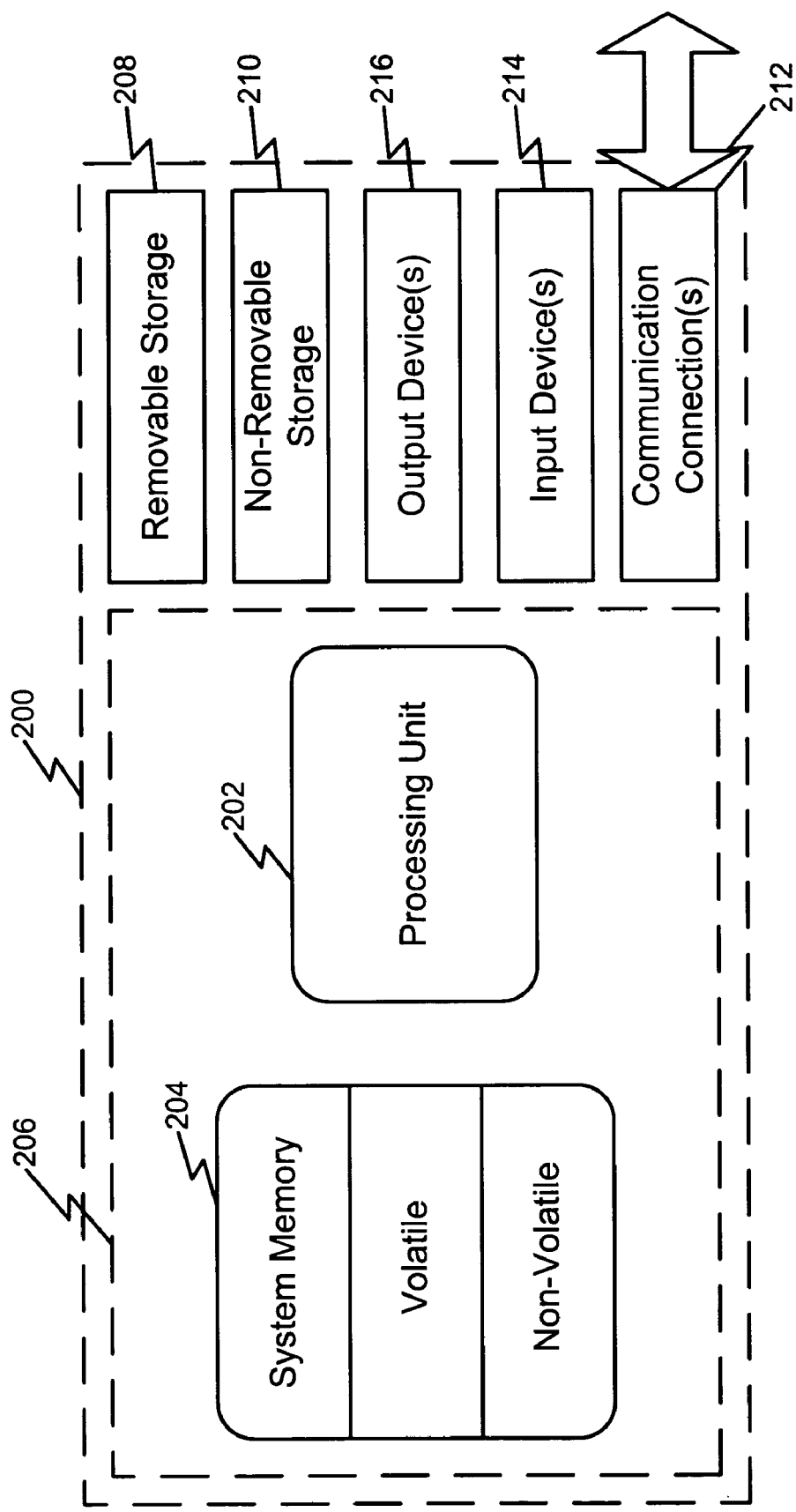
FIG. 2 illustrates an example of a suitable computing system environment on which exemplary embodiments may be implemented.

FIG. 2 illustrates an example of a suitable computing system environment on which embodiments of the invention may be implemented. This system 200 is representative of one that may be used to serve as a client and/or a server as described above. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

A computing device, such as system 200, typically includes at least some form of computer-readable media. Computer-readable media can be any available media that can be accessed by the system 200. By way of example, and not limitation, computer-readable media might comprise computer storage media and communication media.

Figure 3:
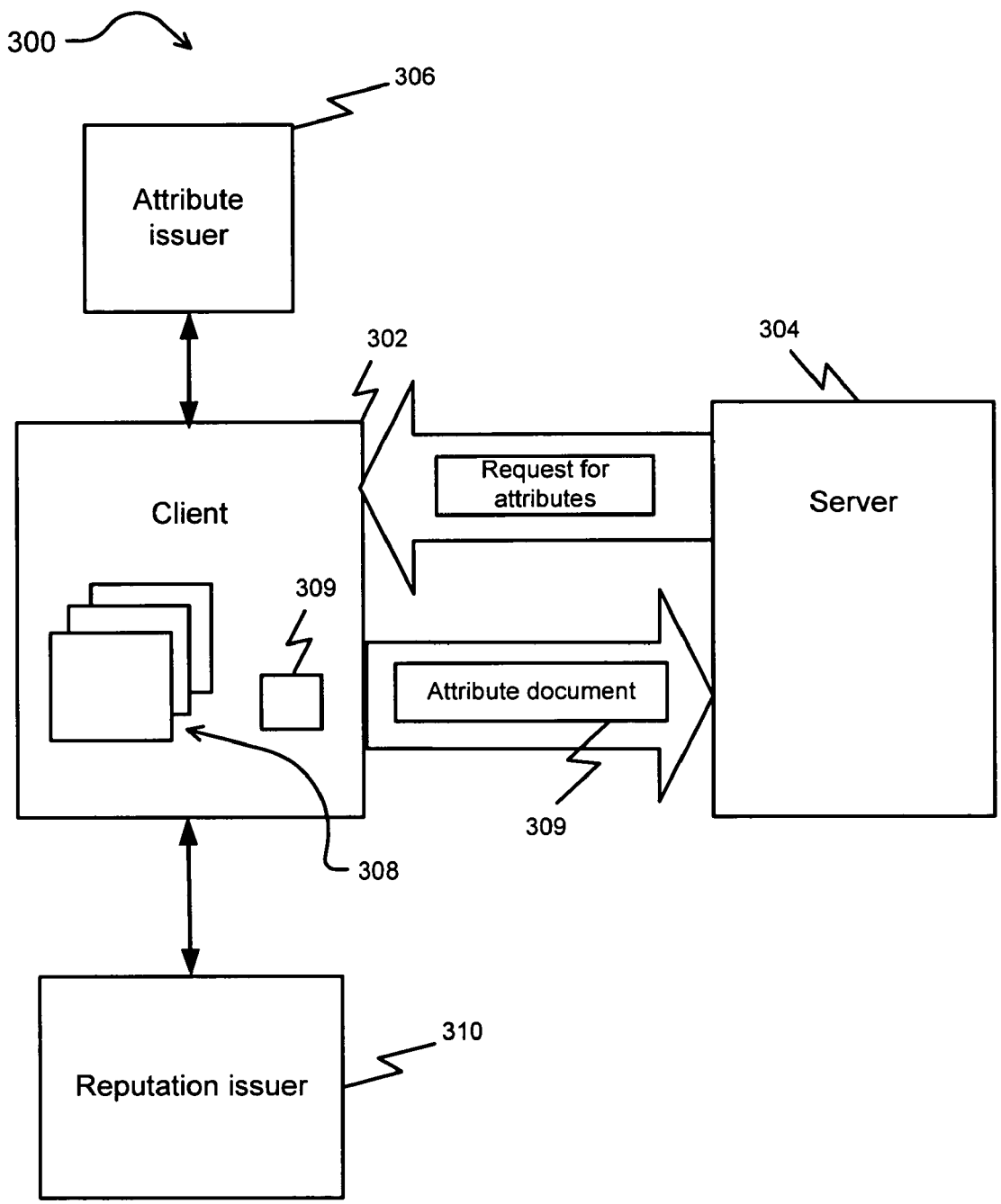
FIG. 3 is a block diagram of a system for integrating multiple identities, identity mechanisms and identity providers according to an exemplary embodiment.

FIG. 3 shows an exemplary embodiment of a system for integrating multiple identities and identity providers, generally at 300. In this embodiment system 300 includes a client 302 and a server 304, as well as an attribute issuer and/or identity provider 306. Client 302 may be communicationally coupled to server 304 and attribute issuer 306 via a communication channel such as a network and/or the Internet and/or other methods as desired.

A user of client 302 may want to access the services of server 304. Once client 302 contacts server 304, server 304 may request authenticated attributes of the user of client 302 such as name and identifier, among others. The user of client 302 may then select from a list and/or collection of attribute groupings 308, which include the attributes requested by server 304. Client 302 may then contact the attribute issuer 306 associated with the attribute grouping to have attribute issuer 306 issue an authenticated attribute document 309 to be provided to server 304.

Client 302 may then provide the authenticated attribute document 309 to server 304 such that server 304 may then allow client 302 to access the operations and/or content provided by server 304. Attribute issuer 306 may be a preauthorized attribute issuer known to server 304. Furthermore, attribute issuer 306 may be a well-known attribute issuer that authenticates information from many different clients.

Attribute documents 309 may be identities or documents with varying degrees of identity information and other information that client 302 may provide to different servers 304. When client 302 accesses the server 304 again, the attribute document 309 provided to the server 304 or the attribute grouping 308 from which document 309 was constituted may be shown to the user of 302. Furthermore, client 302 may have a collection of preconfigured attribute groupings with different information provided within each attribute grouping.

In this manner, client 302 may keep track of what attribute groupings 308, as well as what information has been provided to various servers. Furthermore, the operators of server 304 may have an enhanced level of assurance that the attributes provided by client 302 are somewhat more authentic and/or have been authenticated by a trusted third party. Furthermore, client 302 may keep a list, collection, or other assemblage of attribute groupings 308 that have been preconfigured, preauthorized, and/or provided to various websites on various servers.

Client 302 may also access reputation issuer 310, which may operate similarly to attribute issuer 306 except that reputation issuer 310 may include information of various servers 304 and associated websites, such that client 302 may have some level of assurance that the identity and/or other information provided by server 304 are authentic and/or reliable. With this system, client 302 may better control the dissemination of attributes and/or identity information to various websites and/or servers in a mutually authenticated manner. Furthermore, servers may have a higher level of assurance that the information provided by client 302 is authenticated and/or reliable. Furthermore, client 302 may utilize reputation issuer 310 to obtain more information about various servers such that they may have a heightened level of assurance as to the information provided by the servers.

Figure 4:
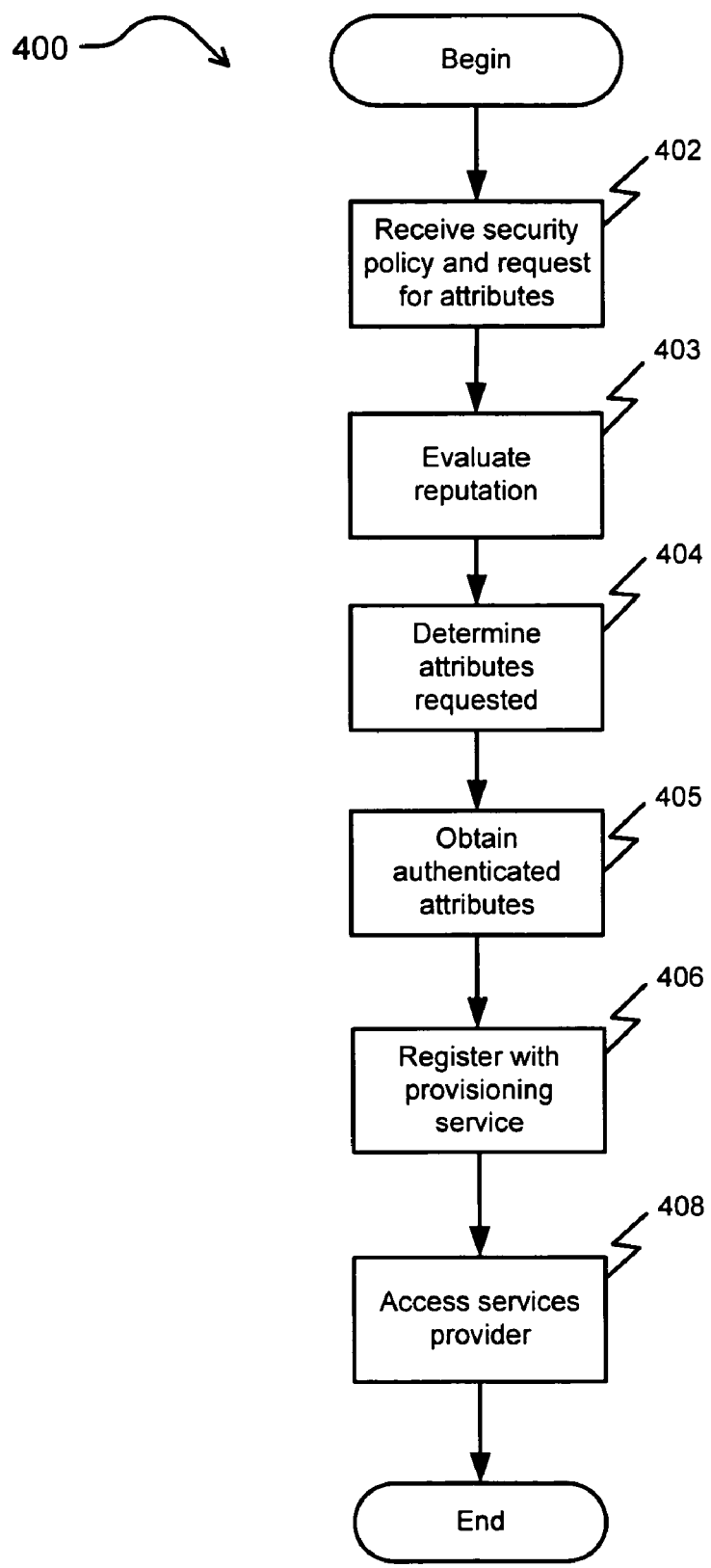
FIG. 4 is a flow diagram illustrating operational characteristics involved in integrating multiple identities, identity mechanisms and identity providers according to an exemplary embodiment.

FIG. 4 is a flowchart illustrating an exemplary embodiment of a method for integrating multiple identities and identity providers, generally at 400. Method 400 includes receive operation 402. Receive operation 402 includes receiving the security policy and requested attributes from a server or other entity. The security policy may require a client accessing the server to provide attributes or other information to gain access to the content and/or services of the server. Control then passes to evaluate operation 403.

Evaluate operation 403 involves evaluating the identity and authenticity of the service provider in order to decide whether it is safe to release user identity and/or other attribute information to it and interact with it further. It may include the client requesting and obtaining reputation information about the service from a trusted reputation issuer, which may operate similar to an attribute issuer, such that client may have some level of assurance that the service or web site is authentic and/or reliable. Control then passes to determine operation 404.

Determine operation 404 may include evaluating the attributes or information requested by the server. Once the attributes are determined, all preconfigured attribute groupings containing the requested information and, if specified, meeting other criteria may be shown to the user. The user may then select an attribute grouping to utilize when accessing the server. Alternatively, if there are no attribute groupings with the requested information, the user may create a new grouping. Control then passes to obtain operation 405.

Obtain operation 405 may include the client system contacting the associated identity or attribute provider in order to obtain an authenticated attribute document. Furthermore, the client may self authenticate the attributes, if this is allowable by the server. Control then passes to register operation 406.

Register operation 406 includes utilizing the attribute document to provide authenticated, requested information to the provisioning service. The provisioning service may also store the attribute information on a database that is accessible by the content server, such that when the client requests access to the server again, the server may access the information such that the client will not have to reregister. Control then passes to access operation 408.

Access operation 408 includes if the attribute document includes the requested attributes, the provisioning service may then provide the information to the content server to allow the client to access the server. When the client requests access to the server again, the server may access the information such that the client will not have to reregister.

Figure 5:
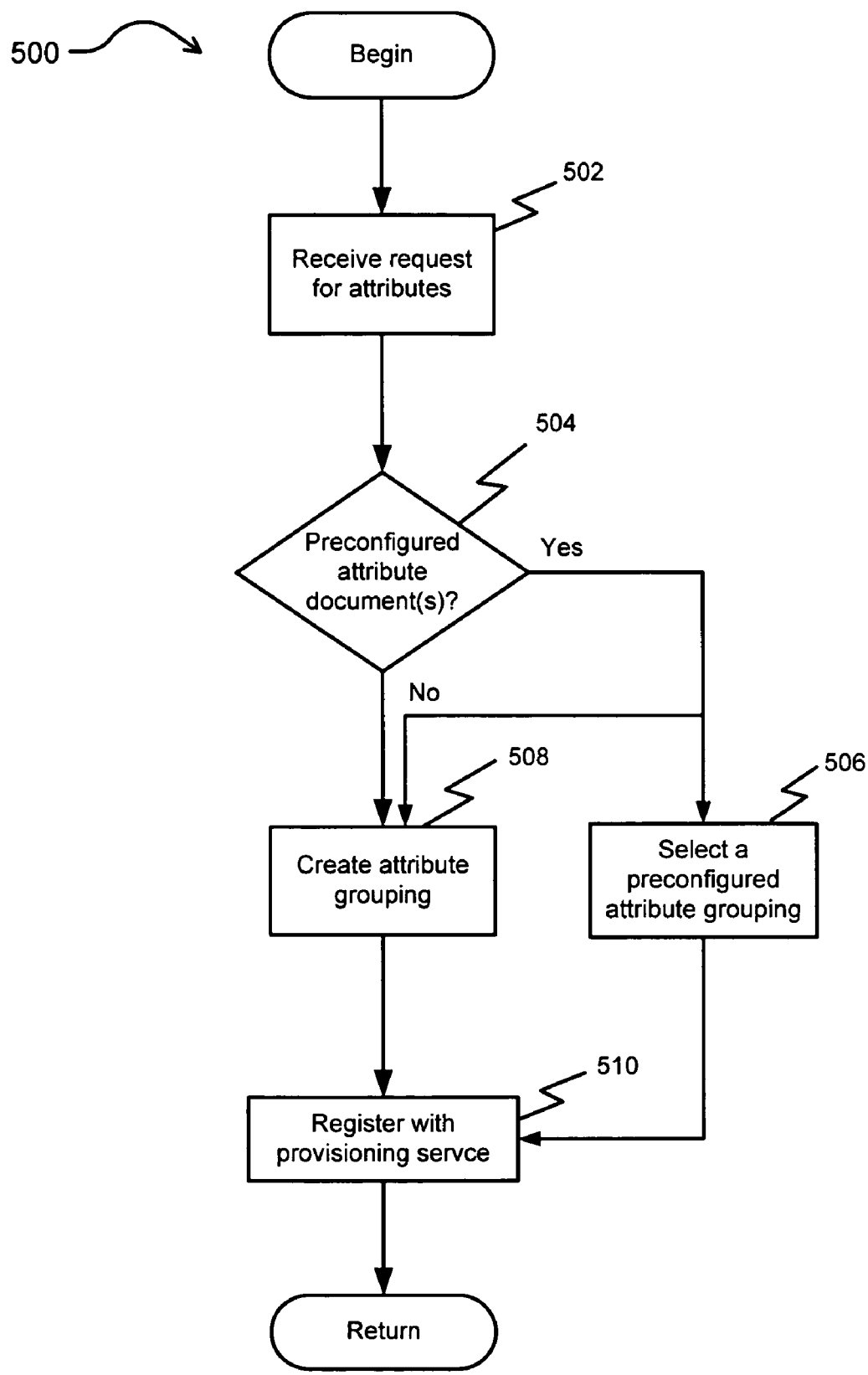
FIG. 5 is a flow diagram illustrating operational characteristics involved in selecting or creating an attribute document according to an exemplary embodiment.

FIG. 5 is a flowchart illustrating a method for obtaining an attribute document for disclosure to a server according to an exemplary embodiment, generally at 500. According to aspects of an exemplary embodiment, method 500, processing begins with receive operation 502. Receive operation 502 includes receiving a request for attributes from a server, as described above. Receive operation 502 may analyze the requested information to determine the information requested by the server. Control then passes to query operation 504.

Query operation 504 includes determining whether the client has any preconfigured attribute groupings containing the requested information. If the client does have one or more preconfigured attribute groupings with the requested attributes, the attribute grouping may be presented to the user along with the associated values, such that the user may select a preconfigured attribute grouping for disclosure 506. The client then may request and obtain a freshly authenticated attribute document from that third party—or may in some cases use a cached copy if one exists.

The user may also choose to create a new attribute grouping 508 including the requested information. If no preconfigured attribute document with the requested information is found, the user would create a new attribute grouping 508 with the requested information. Once an attribute grouping has been selected and presented to the identity or attribute issuer in order to obtain an attribute document, control passes to the register operation 510.

Registering 510 may include transmitting the attribute document to a provisioning service. If the information in the attribute document includes the requested attributes, the provisioning service may store the information in a location accessible to a content server. The content server may then access the information to allow the client access to the content or services of the server. Furthermore the information may be stored in a location that will allow the content server to access the information every subsequent time the client accesses the server to allow the client access to the content and/or services provided by the server.

The logical operations of the various embodiments of the exemplary embodiments may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Although the exemplary embodiments have been described in language specific to computer structural features, methodological acts and by computer readable media, it is to be understood that the exemplary embodiments defined in the appended claims is not necessarily limited to the specific structures, acts or media described. As an example, different formats other than XML may be used to encode identification information. Therefore, the specific structural features, acts and mediums are disclosed as exemplary embodiments implementing the claimed invention.

The various embodiments described above are provided by way of illustration only and should not be construed to limit this disclosure. Those skilled in the art will readily recognize various modifications and changes that may be made to the present disclosure without following the exemplary embodiments and applications illustrated and described herein, and without departing from the true spirit and scope of the present disclosure, which is set forth in the following claims.

What is claimed is:

1. A method of integrating multiple identities, identity providers, and attribute issuers, the method comprising:
   receiving, by a client computer from a server computer, a security policy of a service provider after requesting access to the service provider, wherein the security policy requires the client to provide attributes to gain access to the service provider;
   obtaining reputation information of the service provider, wherein the reputation information comprises information related to the reputation, identity and authenticity of the service provider;
   determining whether the reputation information is acceptable;
   upon determining that the reputation information is acceptable, determining the attributes requested by the service provider in the security policy, wherein the attributes comprise identity information pertaining to a user;
   displaying a collection of preconfigured attribute groupings to the user for selection;
   allowing the user to generate attribute groupings if a suitable preconfigured attribute grouping is not displayed;
   allowing the user to select an attribute grouping, wherein the user selects an attribute grouping from the preconfigured attribute groupings and the generated attribute groupings;
   obtaining authenticated attributes requested by the service provider in the form of an attribute document;
   registering the attribute document with a provisioning service, wherein registering the attribute document comprises storing the attribute document on a database that is accessible by the service provider such that the user does not have to reregister upon making subsequent requests for access to the service provider; and
   accessing services of the service provider based at least in part upon the registration of the attribute document.

2. The method of claim 1, further comprising requesting a security policy of a service provider.

3. The method of claim 1, further comprising obtaining reputation information about a service provider from a reputation issuer.

4. The method of claim 1, further comprising visiting a web site hosted by the service provider.

5. The method of claim 1, wherein obtaining comprises creating authenticated attributes by the client.

6. The method of claim 1, wherein obtaining comprises obtaining authenticated attributes from an attribute issuer.

7. The method of claim 6, wherein the attribute issuer is approved by the service provider.

8. The method of claim 1, wherein the attributes comprise an identity attribute of a user.

9. A system for integrating multiple identities, identity providers, and attribute issuers comprising:
   a processor;
   a communication channel connected with the processor; and
   a memory coupled with and readable by the processor, the memory containing a series of instructions that, when executed by the processor, cause the processor to perform the steps of:
      receiving a security policy of a service provider after requesting access to the service provider, wherein the security policy requires a client accessing the server to provide attributes to gain access to the service provider;
      obtaining reputation information of the service provider, wherein the reputation information comprises information related to the reputation, identity and authenticity of the service provider;
      determining whether the reputation information is acceptable;
      upon determining that the reputation information is acceptable, determining the attributes requested by the service provider in the security policy, wherein the attributes comprise identity information pertaining to a user;
      displaying a collection of preconfigured attribute groupings to the user for selection;
      allowing the user to generate attribute groupings if a suitable preconfigured attribute grouping is not displayed;
      allowing the user to select the attribute grouping;
      obtaining authenticated attributes requested by the service provider in the form of an attribute document;
      registering the attribute document with a provisioning service, wherein registering the attribute document comprises storing the attribute document on a database that is accessible by the service provider such that the user does not have to reregister upon making subsequent requests for access to the service provider; and
      accessing services of the service provider based at least in part upon the registration of the attribute document.

10. The system of claim 9, wherein obtaining authenticated attributes comprises creating authenticated attributes by the user.

11. The system of claim 9, wherein obtaining authenticated attributes comprises obtaining authenticated attributes from an attribute issuer.

12. The system of claim 9, wherein the services provider and the provisioning service reside on a common server.

13. A computer storage medium encoding a computer program of instructions for executing a computer process for authenticating a system, said computer process comprising:
   receiving the security policy of a service provider operating on a server, wherein the security policy requires a client accessing the server to provide attributes or other information to gain access to content and services of the service provider;
   obtaining reputation information of the service provider, wherein the reputation information comprises information related to the reputation, identity and authenticity of the service provider;
   evaluating the reputation information of the service provider;
   based upon the evaluation, determining that the reputation information is acceptable;
   upon determining that the reputation information is acceptable, determining the attributes requested by the service provider in the security policy, wherein the attributes comprise identity information pertaining to a user;
   displaying a collection of preconfigured attribute groupings to the user for selection;
   allowing the user to generate attribute groupings if a suitable preconfigured grouping is not displayed;
   obtaining authenticated attributes requested by the service provider in the form of an attribute document from an attribute issuer associated with the selected attribute grouping; and
   registering the attribute document with a provisioning service to provide authenticated requested information based at least in part upon the authenticated attributes, wherein registering the attribute document comprises storing the attribute document on a database that is accessible by the provisioning service such that the user does not have to reregister upon making subsequent requests for access to the service provider.

14. The method of claim 1, wherein registering the attribute document allows client to access the operations and content provided by the server.

15. The system of claim 9, wherein registering the attribute document allows client to access the operations and content provided by the server.

16. The computer storage medium of claim 13, wherein the attributes comprise an identity attribute of a user.

* * * * *